United States Patent
Blanchard, Jr. et al.

(10) Patent No.: US 9,298,401 B2
(45) Date of Patent: Mar. 29, 2016

(54) CONFIGURING PRINT JOBS ASSOCIATED WITH UNSUPPORTED DOCUMENT FORMATS

(75) Inventors: Richard Blanchard, Jr., Sonoma, CA (US); David Gelphman, Aptos, CA (US); Howard A. Miller, Saratoga, CA (US); Michael R. Sweet, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 13/365,467

(22) Filed: Feb. 3, 2012

(65) Prior Publication Data

US 2013/0201517 A1    Aug. 8, 2013

(51) Int. Cl.
*G06F 3/12* (2006.01)

(52) U.S. Cl.
CPC ............ *G06F 3/1205* (2013.01); *G06F 3/1206* (2013.01); *G06F 3/1232* (2013.01); *G06F 3/1255* (2013.01); *G06F 3/1292* (2013.01)

(58) Field of Classification Search
CPC ... G06F 3/1245; G06F 3/1247; G06F 3/1248; G06F 3/1228; G06F 3/1285; G06F 3/128; G06F 3/1226; G06F 3/1205; G06F 3/1255; G06F 3/1292; G06F 3/1206; G06F 3/1232
USPC ............................................... 358/1.13, 1.15
See application file for complete search history.

(56) References Cited

U.S. PATENT DOCUMENTS

| 5,287,194 | A | 2/1994 | Lobiondo |
| 5,768,483 | A | 6/1998 | Maniwa |
| 6,268,927 | B1 * | 7/2001 | Lo et al. ........................ 358/1.15 |
| 6,549,654 | B1 | 4/2003 | Kumada |
| 2002/0078149 | A1 | 6/2002 | Chang |
| 2002/0138564 | A1 | 9/2002 | Treptow |
| 2003/0063309 | A1 | 4/2003 | Parry |
| 2004/0239986 | A1 | 12/2004 | Wise |
| 2005/0046886 | A1 | 3/2005 | Ferlitsch |
| 2005/0050013 | A1 | 3/2005 | Ferlitsch |
| 2007/0127063 | A1 | 6/2007 | Fertlitsch |

(Continued)

FOREIGN PATENT DOCUMENTS

| CN | 1217503 A | 5/1999 |
| CN | 1525305 A | 9/2004 |

(Continued)

OTHER PUBLICATIONS

First Office Action received in corresponding CN Application No. 201110034596.3 dated Apr. 2, 2013 with translation.

(Continued)

*Primary Examiner* — Kent Yip
(74) *Attorney, Agent, or Firm* — Blank Rome LLP

(57) ABSTRACT

The disclosed embodiments provide a system that facilitates the execution of a print job. During operation, the system obtains print data and a set of job options for the print job, wherein the print data is associated with a document format that is not supported by a printing protocol used to perform the print job. Next, the system obtains a set of document-processing capabilities associated with the document format from a printer associated with the print job. Finally, the system configures the print job based on the job options and the document-processing capabilities without converting the print data into a different document format that is supported by the printing protocol.

20 Claims, 4 Drawing Sheets

(56) References Cited

U.S. PATENT DOCUMENTS

| | | |
|---|---|---|
| 2007/0177192 A1 | 8/2007 | Wang |
| 2007/0182993 A1 | 8/2007 | Yamada |
| 2008/0106604 A1* | 5/2008 | Kojima .................. 348/207.2 |
| 2008/0112013 A1 | 5/2008 | Ferlitsch |
| 2008/0180699 A1 | 7/2008 | Selvaraj |
| 2009/0059272 A1 | 3/2009 | Matsushita |
| 2010/0178067 A1 | 7/2010 | Azami |
| 2011/0194123 A1 | 8/2011 | Sweet |
| 2011/0194124 A1 | 8/2011 | Sweet |
| 2011/0194140 A1 | 8/2011 | Sweet |
| 2011/0194141 A1 | 8/2011 | Sweet |
| 2011/0235064 A1 | 9/2011 | Arai |

FOREIGN PATENT DOCUMENTS

| | | |
|---|---|---|
| CN | 1537298 A | 10/2004 |
| EP | 1450515 A2 | 8/2004 |
| EP | 1818805 A2 | 8/2007 |
| EP | 1953642 A2 | 8/2008 |
| EP | 1973031 A1 | 9/2008 |
| JP | 11053142 A | 2/1999 |
| TW | 201005625 A | 2/2010 |
| WO | 2011100148 A1 | 8/2011 |

OTHER PUBLICATIONS

Office Action received in corresponding U.S. Appl. No. 12/882,107, dated Apr. 26, 2013.
International Search Report and Written Opinion for PCT Application No. PCT/US2011/023474, Dated Mar. 25, 2011, 7 pages.
Cheshire S. et al., "DNS_Based Service Discovery," The Internet Society, Feb. 14, 2004, 32 pages.
Cheshire, S. et al., "Dynamic Configuration of IPv4 Link-Local Addresses," The Internet Society, May 2005, 33 pages.
Wright, F.D., "Design Goals for an Internet Protocol," The Internet Society, Apr. 1999, 86 pages.
"Bonjour Printing Specification," Apple Computer, Inc., Apr. 12, 2005, 24 pages.
Zilles, Stephen, "Rationale for the Structure of the Model and Protocol for the Internet Printing Protocol," The Internet Society, Apr. 1999, 10 pages.
Hastings, T. et al., "Internet Printing Protocol/1.0: Implementers Guide," The Internet Society, Jul. 1999, 65 pages.
Office Action received in corresponding U.S. Appl. No. 12/882,134 dated May 2, 2013.
International Search Report and Written Opinion received in corresponding PCT Application No. PCT/US2013/024031 dated Apr. 17, 2013.
First Office Action received in corresponding CN Application No. 201110034714.0, dated May 24, 2013.
International Search Report and Written Opinion received in corresponding PCT Application No. PCT/US2013/024006 dated Apr. 25, 2013.
Search Report and Written Opinion received in corresponding PCT Application No. PCT/US2011/023475, dated Mar. 25, 2011.

* cited by examiner

CONFIGURING PRINT JOBS ASSOCIATED WITH UNSUPPORTED DOCUMENT FORMATS

RELATED APPLICATION

The subject matter of this application is related to the subject matter in a co-pending non-provisional application by inventors Michael R. Sweet and Howard Miller and filed 14 Sep. 2010, entitled "Framework that Supports Driverless Printing," having Ser. No. 12/882,116.

BACKGROUND

1. Field

The disclosed embodiments relate to printers for computer systems. More specifically, the disclosed embodiments relate to techniques for configuring print jobs associated with document formats that are not supported by printing protocols used to perform the print jobs.

2. Related Art

Printing may facilitate a variety of personal and/or business activities. For example, documents may be printed within a business for design, marketing, accounting, review, record-keeping, planning, and/or notification purposes. Similarly, a user may print pictures and/or greeting cards for display and/or sharing with friends, family, and/or acquaintances.

However, different types of print settings and/or printer capabilities may be required to produce optimal print output for various types of documents. For example, a Portable Document Format (PDF) file may be associated with the highest fidelity and/or quality of print output. However, PDF files may not be compatible with printers that do not support PDF printing. Moreover, printers that support PDF printing may be unable to process large PDF files that exceed the memory limits of the printers and/or PDF files with font formats, encryption, compression formats, bit depths, transparency, and/or color spaces that are not supported by the printers. In other words, the printing of documents may be limited by a printer's document-processing capabilities with respect to different document sizes, document formats, and/or extensions to the document formats.

Hence, what is needed is a mechanism for facilitating the printing of documents associated with various document sizes, document formats, and/or document format extensions on printers with different document-processing capabilities.

SUMMARY

The disclosed embodiments provide a system that facilitates the execution of a print job. During operation, the system obtains print data and a set of job options for the print job, wherein the print data is associated with a document format that is not supported by a printing protocol used to perform the print job. Next, the system obtains a set of document-processing capabilities associated with the document format from a printer associated with the print job. Finally, the system configures the print job based on the job options and the document-processing capabilities without converting the print data into a different document format that is supported by the printing protocol.

In some embodiments, the system also sends the print job to the printer, wherein the print job is executed using the printer.

In some embodiments, the set of job options comprises at least one of a media size, a media type, a print quality, a number of printing sides, a number of copies, and an ink set.

In some embodiments, the document format is PostScript. To obtain the set of document-processing capabilities associated with the document format from the printer, the system may obtain a PostScript Printer Description (PPD) file from the printer, a system database, and/or a centralized database. To configure the print job based on the job options and the document-processing capabilities, the system may add the job options to a prolog for a PostScript file containing the print data.

In some embodiments, the printing protocol is associated with a driverless-printing service.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
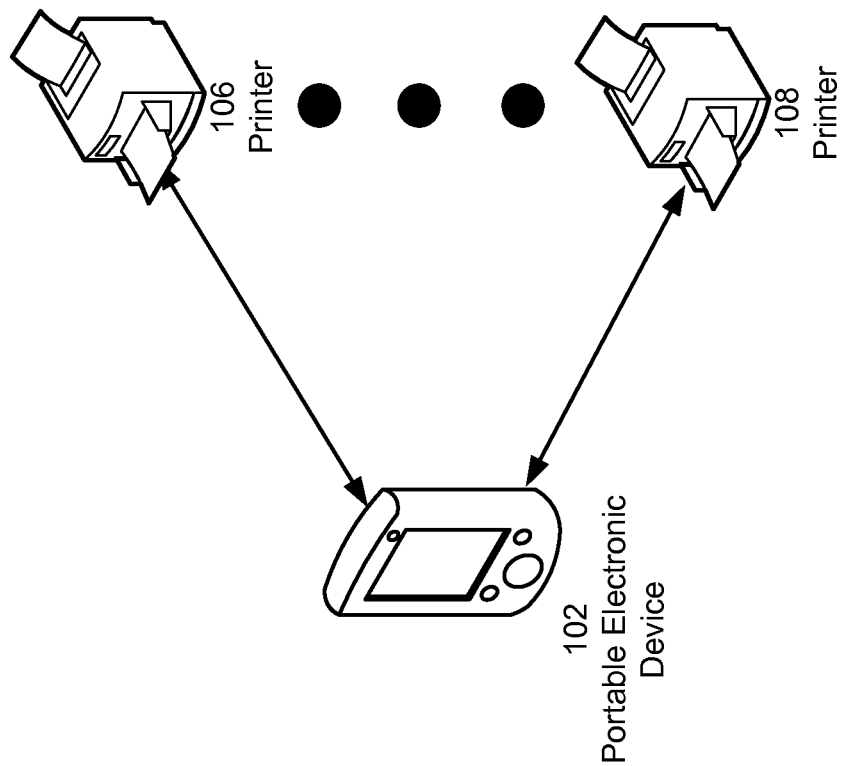
FIG. 1 shows a printing system in accordance with the disclosed embodiments.

The disclosed embodiments facilitate the execution of print jobs. As shown in FIG. 1, a portable electronic device 102 includes functionality to communicate with a set of printers 106-108. For example, portable electronic device 102 may implement a print server that configures print jobs from portable electronic device 102, sends the print jobs to printers 106-108, and receives notifications associated with the print jobs from printers 106-108. Alternatively, portable electronic device 102 may communicate with printers 106-108 through an external print server.

Portable electronic device 102 may correspond to a mobile phone, laptop computer, tablet computer, personal digital assistant (PDA), portable media player, and/or other type of battery-powered electronic device. Printers 106-108 may correspond to network printers that are capable of wired and/or wireless communications. Alternatively, one or more printers may connect to portable electronic device 102 and/or another print server as local peripherals using one or more printer cables and/or one or more ports (e.g., parallel ports, serial ports, Universal Serial Bus (USB) ports).

Portable electronic device 102 may interact with printers 106-108 through one or more networks. Such networks may include any type of communication channel capable of coupling together network nodes. For example, the network(s) may include a wireless network connection, such as a Bluetooth (Bluetooth™ is a registered trademark of Bluetooth SIG, Inc.) network connection; a cellular networking connection (e.g., a 3G/4G network or an Edge network); a networking connection based on the standards described in Institute for Electrical and Electronic Engineers (IEEE) 802.11; a wireless personal-area networking (PAN) connection, such as a network connection based on the standards described in IEEE 802.15; or any peer-to-peer (wireless or wired) networking technology.

In one or more embodiments, the printing system of FIG. 1 includes functionality to perform "driverless printing," in which a user of portable electronic device 102 may print to a nearby printer (e.g., printers 106-108) without installing and/or updating associated printer driver software. For example, portable electronic device 102 may discover (e.g., detect) a nearby printer (e.g., printers 106-108) using a discovery protocol such as Bonjour (Bonjour™ is a registered trademark of Apple Inc.). To enable detection of the printer by portable electronic device 102, the printer may advertise a driverless-printing service on the discovery protocol. For example, the printer may advertise the driverless-printing service on Bonjour by publishing a specific service type and subtype.

Figure 2:
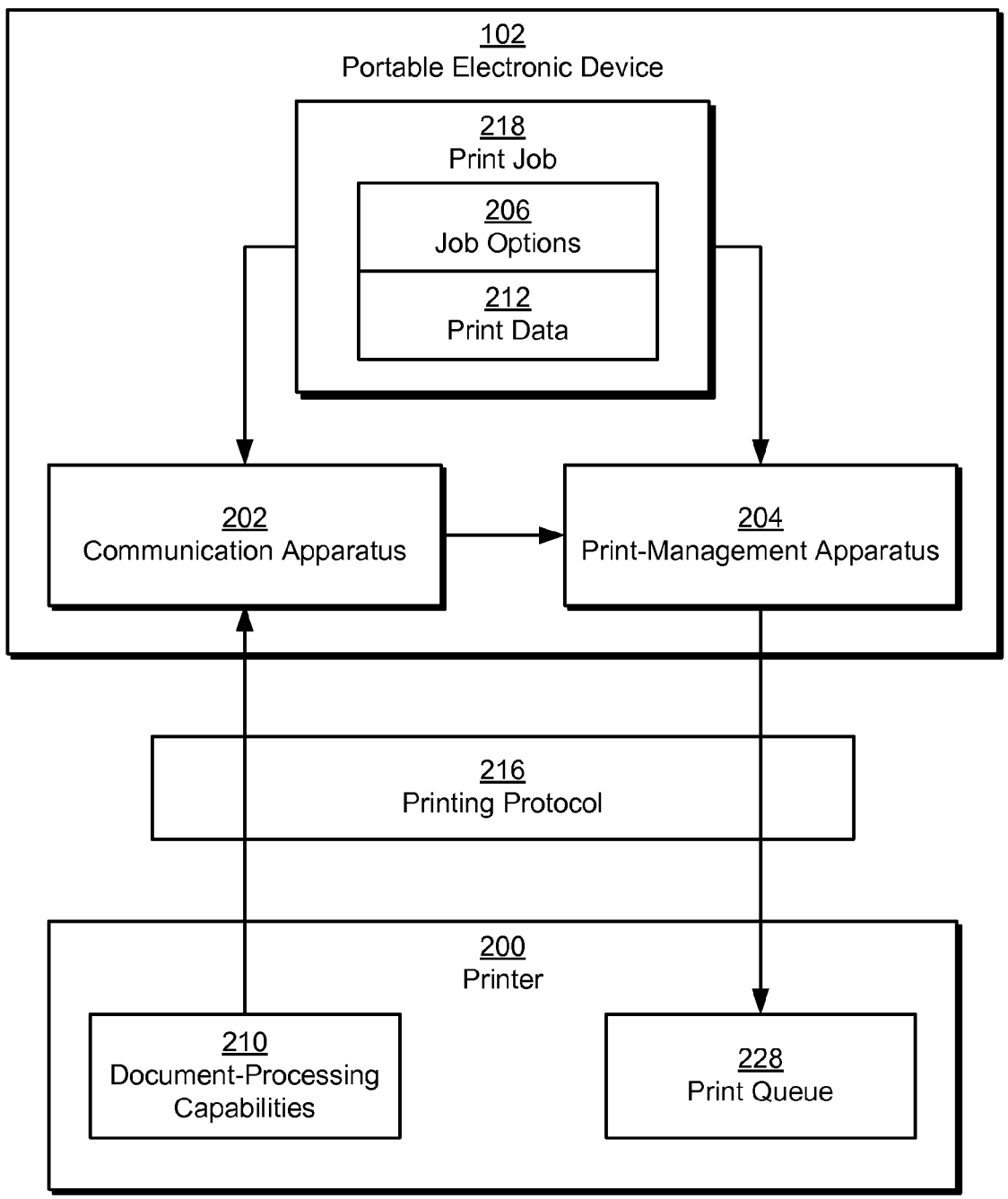
FIG. 2 shows a system for facilitating the execution of a print job in accordance with the disclosed embodiments.

As shown in FIG. 2, once a printer 200 is selected for performing a print job 218 (e.g., by a user of portable electronic device 102), a print-management apparatus 204 on portable electronic device 102 may obtain print job 218 from an application on portable electronic device 102 and transmit print job 218 to printer 200 over a network connection with printer 200. Printer 200 may then place print job 218 into a print queue 228 and execute print job 218 after print jobs preceding print job 218 in print queue 228 have been completed and/or cancelled. Driverless printing for portable electronic devices is discussed in further detail in a co-pending non-provisional application by inventors Michael R. Sweet and Howard Miller and filed 14 Sep. 2010, entitled "Framework that Supports Driverless Printing," having Ser. No. 12/882,116 and filing date 14 Sep. 2010, which is incorporated herein by reference.

Those skilled in the art will appreciate that printer 200 may support a number of document formats to enable processing of print jobs (e.g., print job 218) from different applications and/or print servers. For example, printer 200 may support printing of Portable Document Format (PDF) documents, Joint Photographic Experts Group (JPEG) documents, PostScript (PostScript™ is a registered trademark of Adobe Inc.) documents, and/or raster format documents. In addition, printer 200 may provide a set of document-processing capabilities 210 for each document format supported by printer 200. For example, printer may specify a memory limit, maximum dimensions (e.g., for an image), a compression format, a bit depth, an encryption capability, a font-management capability, a color-management capability, a duplex-printing capability, a collation capability, a stapling capability, and/or a transparency-support capability for the PDF, JPEG, PostScript, and/or raster document formats.

Conversely, portable electronic device 102 and/or printer 200 may be unable to process print data (e.g., print data 212) associated with document formats and/or document attributes 208 that are not supported by printer 200 and/or a printing protocol 216 used to perform print jobs (e.g., print job 218). For example, printing protocol 216 (e.g., Internet Printing Protocol (IPP), the driverless-printing service, etc.) may support the PDF, JPEG, and raster document formats but not the PostScript document format. As a result, print jobs that contain print data in PostScript format may require conversion of the print data into a format supported by the driverless-printing service before the print jobs can be transmitted from portable electronic device 102 to printer 200, even if printer 200 natively supports PostScript.

In one or more embodiments, the system of FIG. 2 includes functionality to facilitate the execution of print job 218 on printer 200 by enabling the use of document formats that are not supported by printing protocol 216 in print job 218 and/or other print jobs on portable electronic device 102, if such document formats are natively supported by printer 200. First, a communication apparatus 202 in portable electronic device 102 may obtain print data 212 for print job 218. As mentioned above, print data 212 may be associated with a document format that is not supported by printing protocol 216. For example, print data 212 may be provided in PostScript format, which is not supported by the driverless-printing service used by portable electronic device 102 to print to printer 200.

Communication apparatus 202 may also obtain a set of job options 206 for print job 218. Job options 206 may correspond to settings provided by a user requesting print job 218. For example, job options 206 may include a number of copies, a number of printing sides (e.g., single- or double-sided), collation, stapling, hole punching, an ink set (e.g., black-and-white, color), a media size (e.g., A4, letter), a border size (e.g., bordered, borderless), a toner, a dye, a ribbon, a media type (e.g., glossy, matte, bond, colored), a resolution and/or print quality (e.g., low, medium, high), a page orientation, and/or a printing range (e.g., page range, selection).

To enable configuration of print job 218 using the document format associated with print data 212, communication apparatus 202 may obtain a set of document-processing capabilities 210 for the document format. For example, communication apparatus 202 may use printing protocol 216 (e.g., Internet Printing Protocol (IPP), driverless-printing service, etc.) to query printer 200, a system database, and/or a centralized database for a PostScript Printer Description (PPD) associated with a PostScript interpreter on printer 200. The PPD may contain the version of the PostScript interpreter, as well as a memory limit, a duplex-printing capability, a stapling capability, a font-management capability, a color-management capability, and/or a collation capability for the PostScript interpreter. As a result, the PPD may allow portable electronic device 102 to confirm native support for PostScript on printer 200 and create a mapping of non-PostScript-specific job options 206 to PostScript-specific document-processing capabilities 210.

Print-management apparatus 204 may then configure print job 218 based on job options 206 and document-processing capabilities 210 without converting print data 212 into a different document format that is supported by printing protocol 216. Continuing with the above example, print-management apparatus 204 may configure a PostScript print job by adding job options 206 to a prolog for a PostScript file containing print data 212 according to document-processing capabilities 210 described in the PPD for the PostScript interpreter on printer 200. In other words, print-management apparatus 204 may reformat print job 218 so that job options 206 are understandable by printer 200 using native document-processing capabilities 210 for the document format associated with print data 212.

Finally, print-management apparatus 204 may send print job 218 to printer 200 for execution of print job 218 by printer 200. Consequently, the system of FIG. 2 may enable the use of both printing protocol 216 and native document-processing capabilities 210 on printer 200 to process print jobs associated with document formats that are not supported by printing protocol 216. For example, the system of FIG. 2 may allow portable electronic device 102 to correctly configure a print job containing PostScript print data and send the print job to printer 200 through a driverless-printing service that does not support PostScript without requiring the installation of a printer driver for printer 200 on portable electronic device 102 and/or the conversion of the PostScript data into a format that is supported by the driverless-printing service (e.g., PDF, JPEG, raster).

Figure 3:
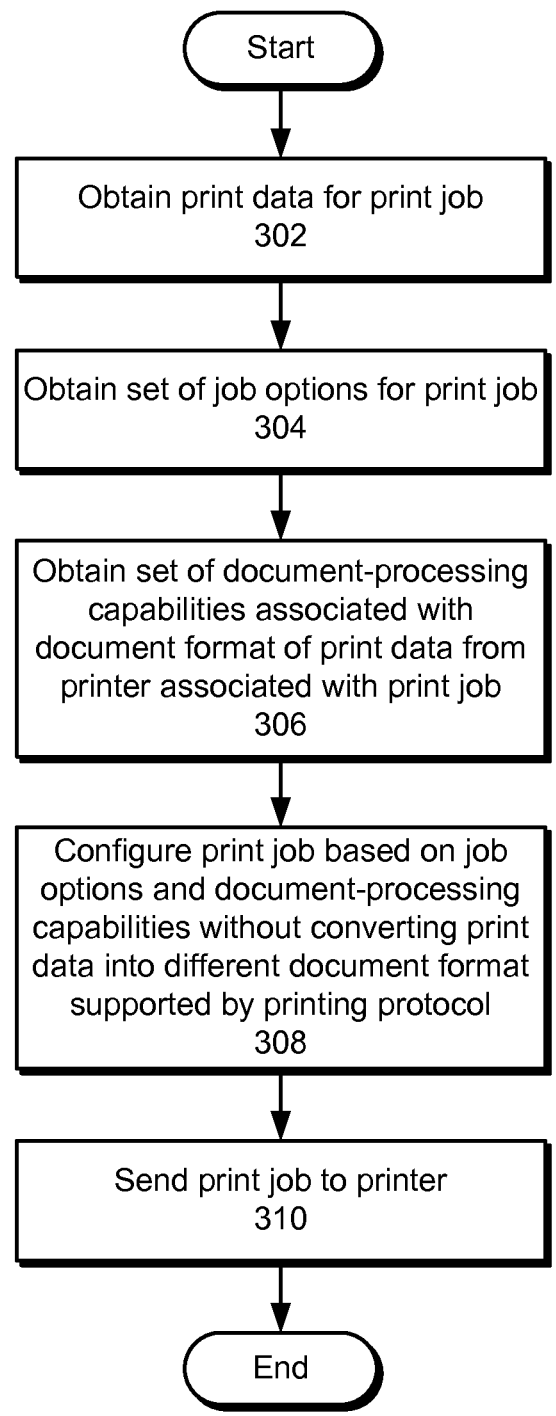
FIG. 3 shows a flowchart illustrating the process of facilitating the execution of a print job in accordance with the disclosed embodiments.

FIG. 3 shows a flowchart illustrating the process of facilitating the execution of a print job in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, print data for a print job is obtained (operation 302). The print data may be associated with a document format that is not supported by a printing protocol used to perform the print job. For example, the print data may correspond to a PostScript file, which is in a document format that is not supported by a driverless-printing service used to perform the print job. Job options for the print job are also obtained (operation 304). The job options may be provided by a user of the portable electronic device and may specify a media size, a media type, a print quality, a number of printing sides, a number of copies, and/or an ink set for the print job.

Next, a set of document-processing capabilities associated with the print data's document format is obtained from a printer associated with the print job, a system database, and/or a centralized database (operation 306). For example, the printer's document-processing capabilities for the PostScript document format may be obtained as a PPD file from the printer.

The print job is then configured based on the job options and the document-processing capabilities without converting the print data into a different document format supported by the printing protocol (operation 308). Continuing with the above examples, the job options may be added to a prolog for the PostScript file according to the document-processing capabilities specified in the printer's PPD file to enable processing of the print job using the user-specified job options instead of the default job options for the printer.

Finally, the print job is sent to the printer (operation 310), where the print job is executed. For example, the print job may be transmitted to the printer through the driverless-printing service, even if the print data is not supported by the driverless-printing service. The print job may then be executed by the printer using native document-processing capabilities for the print data's document format instead of document-processing capabilities associated with the driverless-printing service.

Figure 4:
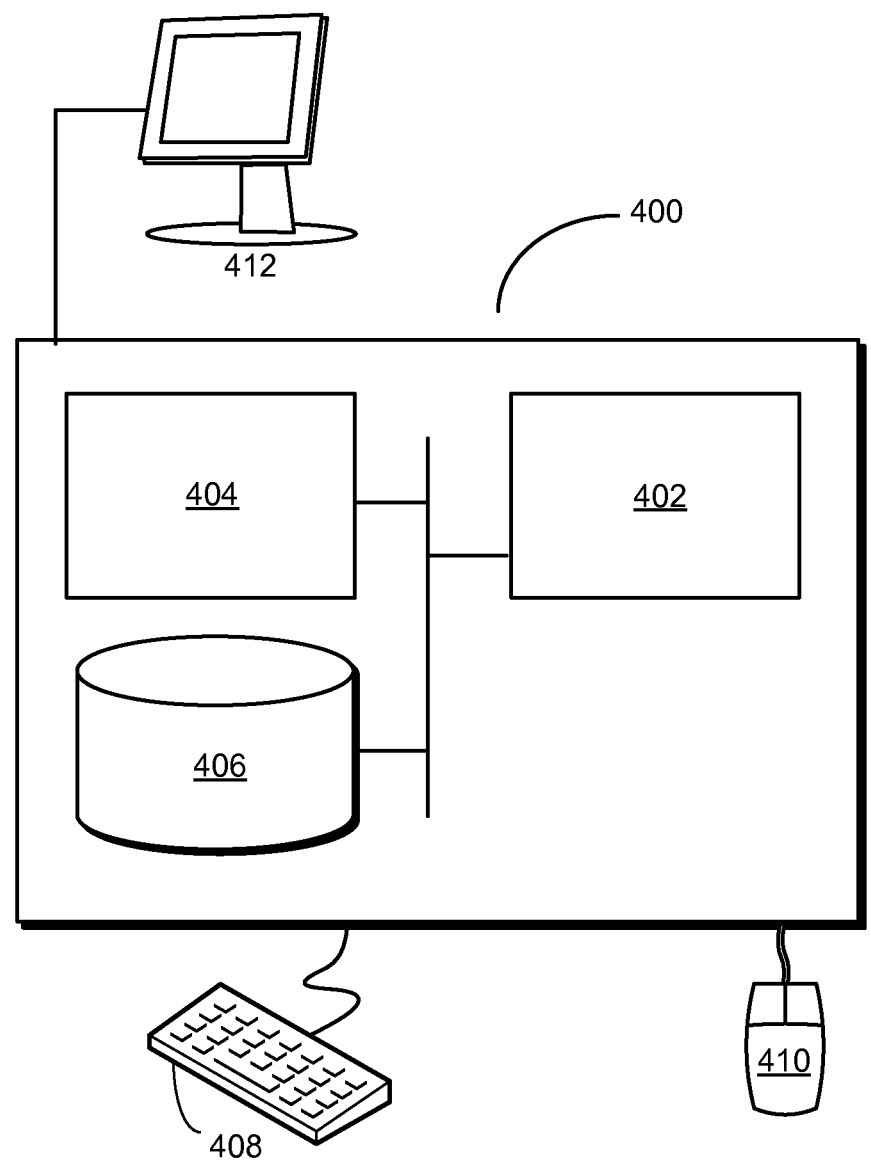
FIG. 4 shows a computer system in accordance with the disclosed embodiments.

FIG. 4 shows a computer system 400 in accordance with the disclosed embodiments. Computer system 400 may correspond to an apparatus that includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for facilitating the execution of a print job. The system may include a communication apparatus that obtains print data and a set of job options for the print job. The print data may be associated with a document format that is not supported by a printing protocol used to perform the print job. The communication apparatus may also obtain a set of document-processing capabilities associated with the document format from a printer associated with the print job. The system may also include a print-management apparatus that configures the print job based on the job options and the document-processing capabilities without converting the print data into a different document format that is supported by the printing protocol. The print-management apparatus may then send the print job to the printer for execution of the print job by the printer.

In addition, one or more components of computer system 400 may be remotely located and connected to the other components over a network. Portions of the present embodiments (e.g., communication apparatus, print-management apparatus, portable electronic device, printer, etc.) may also be located on different nodes of a distributed system that implements the embodiments. For example, the present embodiments may be implemented using a number of portable electronic devices and a number of printers configured to perform printing for the portable electronic devices using a driverless-printing service.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the execution of a print job, comprising:

obtaining print data and a set of job options for the print job, wherein the print data is associated with a first document format and the first document format is not supported by a first printing protocol;

obtaining a set of document-processing capabilities associated with the first document format from a printer associated with the print job; and configuring the print job based on the job options and the document-processing capabilities without converting the print data into a different document format that is supported by the first printing protocol; and sending the print job to the printer using the first printing protocol, wherein the print job comprises print data associated with the first document format, which is not supported by the first printing protocol.

2. The computer-implemented method of claim 1, further comprising:

sending the print job to the printer, wherein the print job is executed using the printer.

3. The computer-implemented method of claim 1, wherein the set of job options comprises at least one of:

a media size;
a media type;
a print quality;
a number of printing sides;
a number of copies; and
an ink set.

4. The computer-implemented method of claim 1, wherein the first document format is PostScript.

5. The computer-implemented method of claim 4, wherein obtaining the set of document-processing capabilities associated with the first document format from the printer involves:

obtaining a PostScript Printer Description (PPD) file from the printer.

6. The computer-implemented method of claim 4, wherein configuring the print job based on the job options and the document-processing capabilities involves:

adding the job options to a prolog for a PostScript file containing the print data.

7. The computer-implemented method of claim 1, wherein the first printing protocol is associated with a driverless-printing service.

8. A system for facilitating the execution of a print job, comprising:

a communication apparatus configured to:
  obtain print data and a set of job options for the print job, wherein the print data is associated with a first document format and the first document format is not supported by a first printing protocol; and
  obtain a set of document-processing capabilities associated with the first document format from a printer associated with the print job; and a print-management apparatus configured to configure the print job based on the job options and the document-processing capabilities and to send the print job to the printer using the first printing protocol, wherein the print job comprises print data associated with the first document format, which is not supported by the first printing protocol.

9. The system of claim 8, wherein the set of job options comprises at least one of:

a media size;
a media type;
a print quality;
a number of printing sides;
a number of copies; and
an ink set.

10. The system of claim 8, wherein the first document format is PostScript.

11. The system of claim 10, wherein obtaining the set of document-processing capabilities associated with the first document format from the printer involves:

obtaining a PostScript Printer Description (PPD) file from the printer.

12. The system of claim 10, wherein configuring the print job based on the job options and the document-processing capabilities involves:

adding the job options to a prolog for a PostScript file containing the print data.

13. The system of claim 8, wherein the first printing protocol is associated with a driverless-printing service.

14. A non-transitory computer-readable storage medium storing instructions that when executed by a computer cause the computer to perform a method for facilitating the execution of a print job, the method comprising:

obtaining print data and a set of job options for the print job, wherein the print data is associated with a first document format and the first document format is not supported by a first printing protocol;

obtaining a set of document-processing capabilities associated with the first document format from a printer associated with the print job; and configuring the print job based on the job options and the document-processing capabilities without converting the print data into a different document format that is supported by the first printing protocol; and sending the print job to the printer using the first printing protocol, wherein the print job comprises print data associated with the first document format, which is not supported by the first printing protocol.

15. The non-transitory computer-readable storage medium of claim 14, the method further comprising:

sending the print job to the printer, wherein the print job is executed using the printer.

16. The non-transitory computer-readable storage medium of claim 14, wherein the set of job options comprises at least one of:

a media size;
a media type;
a print quality;
a number of printing sides;
a number of copies; and
an ink set.

17. The non-transitory computer-readable storage medium of claim 14, wherein the first document format is PostScript.

18. The non-transitory computer-readable storage medium of claim 17, wherein obtaining the set of document-processing capabilities associated with the first document format from the printer involves:

obtaining a PostScript Printer Description (PPD) file from the printer.

19. The non-transitory computer-readable storage medium of claim 17, wherein configuring the print job based on the job options and the document-processing capabilities involves:

adding the job options to a prolog for a PostScript file containing the print data.

20. The non-transitory computer-readable storage medium of claim 14, wherein the first printing protocol is associated with a driverless-printing service.

* * * * *